United States Patent [19]

Pyi et al.

[11] Patent Number: 4,839,842

[45] Date of Patent: Jun. 13, 1989

[54] DIGITAL TONE DETECTION AND GENERATION

[75] Inventors: Hwa-Sheng Pyi, Sunnyvale, Calif.; Saf Asghar, Austin, Tex.

[73] Assignee: Advanced Micro Devices, Sunnyvale, Calif.

[21] Appl. No.: 77,268

[22] Filed: Jul. 24, 1987

[51] Int. Cl.$^4$ .............................................. G06F 1/02
[52] U.S. Cl. ...................................................... 364/721
[58] Field of Search ................................. 364/721, 718

[56] References Cited

U.S. PATENT DOCUMENTS 3,649,821 3/1972 Gumacos ........................... 364/721 X
4,249,447 2/1981 Tomisawa ......................... 364/721 X

OTHER PUBLICATIONS

Handscomb, "Methods of Numerical Approximation", pp. 47–48, Pergamon Press Ltd, 1966.
Watson, "Approximation Theory and Numerical Methods", pp. 102–110, copyright 1980 by John Wiley & Sons Ltd.

Primary Examiner—Gary V. Harkcom
Assistant Examiner—Tan V. Mai
Attorney, Agent, or Firm—Keneth B. Salomon; Richard E. Cummins

[57] ABSTRACT

Fast methods of tone detection and tone generation disclosed are particularly suitable for implementation in a digital signal processor. Chebyshev polynomials are employed to generate periodic waveforms and to detect such waveforms. In an alternative aspect of the invention, trigonometric formulae are employed to generate periodic waveforms which are representable as the sum of sine and cosine functions. Unlike analog techniques, the digital techniques do not entail long delays in the generation or detection of tones because a fast iterative recalculation is employed at each step. Accumulated error is avoided by restarting the procedure once a predetermined value is exceeded. Independent choice of a quality factor and a confidence level is provided by the digital tone detection technique.

4 Claims, 2 Drawing Sheets

DIGITAL TONE DETECTION AND GENERATION

The present invention relates to digital detection and generation of periodic signals and, more particularly, to a method using Chebyschev polynomials and trigonometric formulae to approximate periodic waveforms.

BACKGROUND OF THE INVENTION

Digital tone detection and generation is useful in telecommunications, such as in dual-tone multi-frequency (DTMF) used in "two tone" or "multi-tone" signaling. Known in the art are Sinerom, Taylor series and discrete fourier transform methods of generation. These methods are computationally complex and require a large storage memory. For tone detection, analog filtering of tones followed by analog energy detection is employed.

Conventional tone detection apparatus typically employs an analog tone filter which receives an input signal. The tone filter is typically a high-"Q" (quality-factor) providing extremely sharp rise and fall characteristics around the resonant frequency. Such analog circuitry is complex and costly to manufacture. More importantly, its response is sensitive to changes in temperature, voltage, component values and the like which result in variations in gain and band-pass characteristics.

The tone detection apparatus employs an energy detector following the tone filter responsive to the filtered signal which requires that a "confidence level" be selected. The energy detector produces a signal which is monitored by a decision device which determines whether the detected energy exceeds a "threshold" level and produces a binary-valued output therefrom indicating whether the received signal has the appropriate frequency at a satisfactory energy level.

The time required to detect a tone by such apparatus is determined by the Q factor and confidence level selected. This time can be substantial if a high level of quality and confidence is required.

SUMMARY OF THE INVENTION

The present invention provides a method for generation and detection of tone signals by digital means. In one embodiment of the invention, terms of a Chebyshev sequence are used recursively to digitally generate a sequence of normalized tone signals. Because roundoff and truncation errors will propagate and accumulate, errors will tend to grow if no corrective action is taken. The method of the instant invention provides that when a term in the sequence exceeds a predetermined value, the generation of tone signals is restarted.

The method of the instant invention is particularly suited to digital computation because it involves only one left shift, one multiplication and one subtraction to generate each term in the sequence of tone signals. Accordingly, little or no delay is experienced in the tone detection according to the invention.

In an alternative embodiment of the invention, terms of a trignometric formulae are employed iteratively to generate both cosine and sine wave tone signals. As with the first embodiment, the method of the instant invention calls for restarting of the generation of tones whenever a term exceeds a predetermined value. The alternative method is equally well suited to digital computation.

In an application of the digital tone generation method of the instant invention, a method of digital tone detection is provided by the instant invention. The term-by-term difference between a sequence of measured tone signals and the signal predicted by the corresponding term of the Chebyshev sequence is determined. If the absolute value of this difference is less than a predetermined threshold value then it is concluded that the measured tone signals have the frequency of the Chebyshev sequence.

The digital tone detection method of the instant invention can be controlled to provide a high "Q" or a low "Q" filter. Independently, a selectable confidence level can be provided for the detection.

DETAILED DESCRIPTION OF A PREFERRED EMBODIMENT

Figure 1:
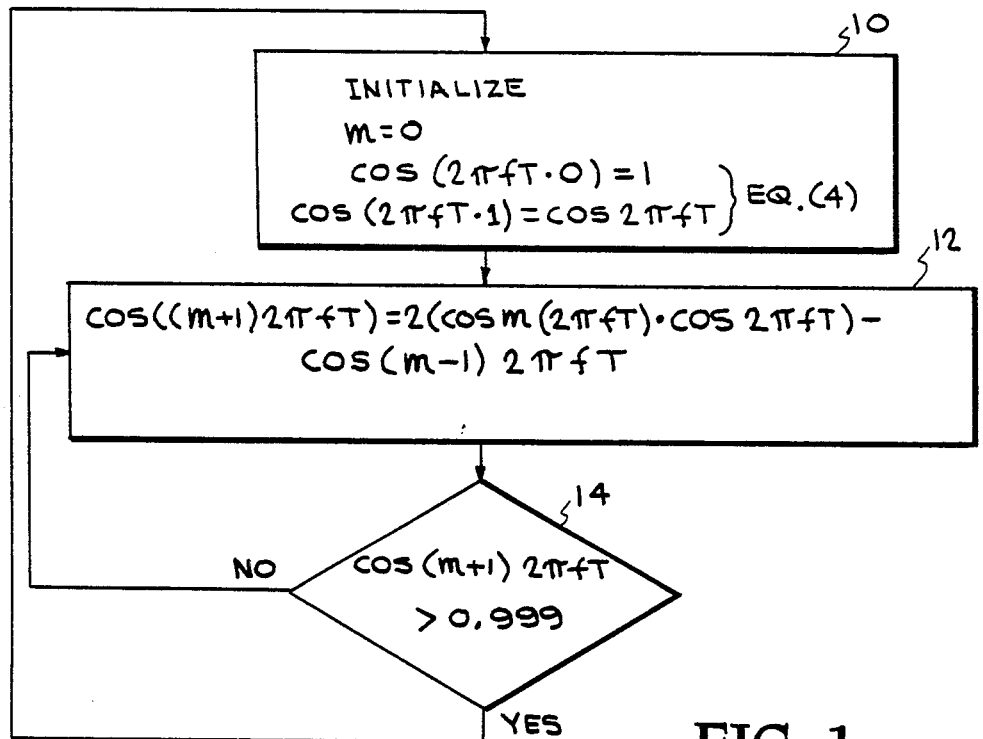
FIG. 1 is a flowchart describing the method of digital generation of tones according to the instant invention.

Any single tone signal can be appropriately scaled to be represented as a cosine or sine waveform using methods well-known to those of ordinary skill in the art. A cosine waveform having a frequency f can be sampled at periodic sampling intervals of T time units to produce the sequence $\{\cos(2\pi fTm)\ m=0, 1, 2, 3, \ldots\}$.

Terms of the Chebyschev polynomial are given by the formula $$C_m(x) = \cos(m\ \mathrm{arc\ cos}(x))\ m=0, 1, 2, \ldots. \quad (1)$$

A general recursive relationship exists between the terms $C_{m-1}$, $C_m$ and $C_{m+1}$:

$$C_{m+1}(x) = 2C_m(x)C_1(x) - C_{m-1}(x). \quad (2)$$

by expressing the terms $C_{m-1}$, $C_m$ and $C_{m+1}$ in equation (2) in terms of the cosine functions of equation (1), and using $T = \mathrm{arc\ cos}(x)$ yields $$\cos(m+1)2\pi fT = 2\cos(m2\pi fT)\cdot\cos 2\pi fT - \cos 2\pi fT\ (m-1) \quad (3)$$

Equation (3) thus allows a sequence of normalized tone signals to be recursively generated for values of $m = 1, 2, \ldots$, by starting with $\cos(0 - 2\pi fT) = 1$ and $\cos(1 - 2\pi fT) = \cos 2\pi fT$. $\quad (4)$ The recursive generation of tone signals can thus be effected by repeated recalculation of Equation (3). For a tone of frequency f and amplitude A, samples can be generated every T seconds resulting in the signal waveform $$S = A\cos(m(2\pi fT)) \quad (5)$$

As will be appreciated by those skilled in the art, such recalculations are readily performed by a digital processor, in which the term $\cos(m(2\pi fT))$ can be iteratively calculated by equation (3). Roundoff and truncation errors will be propagated by such a procedure, however. The errors tend to accumulate and would produce a waveform of ever-increasing error if not corrected.

By reinitializing the computation periodically, this accumulation problem can be avoided.

A flowchart of the method of the instant invention is provided as FIG. 1. A block 10 is initially entered which performs the initialization steps indicated by Equations (4). A block 12 is next entered which performs the iterative calculation of the next sample term according to Equation (3). Next a decision block 14 is entered which tests whether the term calculated in block 12 exceeds 0.999. If not, a "No" exit is taken from decision block 14 back to block 12 and the next sample term is calculated in block 12. If the test performed in block 14 indicates that the term exceeded 0.999, a "YES" exit is taken from block 14 which causes block 10 to be entered. Accordingly, any accumulated error is removed as the sequence of terms is reinitialized and restarted once again. In accordance with this method then, the calculations to generate one sample at block 12 requires one left shift, one multiplication and one subtraction.

As described hereinabove, the particular frequency and amplitude desired in the resulting waveform, S, is given by Equation (5). The value used in block 12 of 0.999 is selected to be near the maximum value that the cosine function can take (1.0) and yet be readily reached within a few iterations of the loop including the "No" exit.

Figure 2:
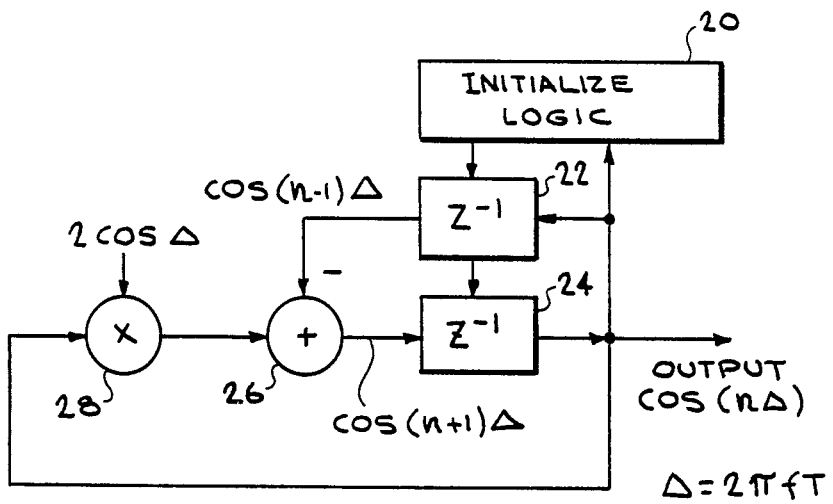
FIG. 2 is a signal-flow diagram for the digital generation of tones according to the instant invention.

Now with reference to FIG. 2, a signal-flow diagram of an implementation of the method of the instant invention is provided. An initialization block 20 generates the first two terms of the sequence of a tone signal according to Equation (4). These signals are received at a first input of a one time-unit delay block 22 and a first input of a one time-unit delay block 24. Delay block 22 generates a signal received by an adder node 26 at a subtractice input thereto. Adder 26 also receives at an additive input a signal generated by a multiplier node 28. Multiplier 28 receives at a first input the signal generated by second delay block 24 and at a second input the fixed signal 2 cos T. The signal generated by delay 24 is also conducted to a second input of delay 22 and the signal generated by adder 26 is conducted to a second input of delay 24. The signal generated by delay 24 is also conducted to the initialization block 20 and is the output signal corresponding to Equation (3). Circuitry internal to block 20 implements the test performed in flowchart decision block 14 (FIG. 1) and resets the signals generated so that the first two terms of the sequence of tone signals are conducted to delays 22 and 24.

Delay blocks 22 and 24 receive control signals (not shown) from initialization block 20 which cause the signals at their first inputs to be selected during the first time period after initialization and signals at their second inputs to be selected at all other time periods.

An alternative method of generation is required when both cosine and sine waveforms need be generated. Such is the case when a Quadrature Amplitude Modulation (QAM) scheme is used to transmit digital data over analog telecommunication lines.

In this case, the trigonometric, identities $$\cos(m + 1)2\pi fT = \cos m 2\pi fT \cdot \cos 2\pi fT \qquad (6)$$

$$\sin(m + 1)T = \sin m\ T \quad \cos T \begin{Bmatrix} -\sin m 2\pi fT \cdot \sin 2\pi fT \\ \\ +\cos m 2\pi fT \cdot \sin 2\pi fT \end{Bmatrix}$$

can be employed in an iterative manner to generate both cosine and sine wave samples of frequency f at intervals of T seconds.

Figure 3:
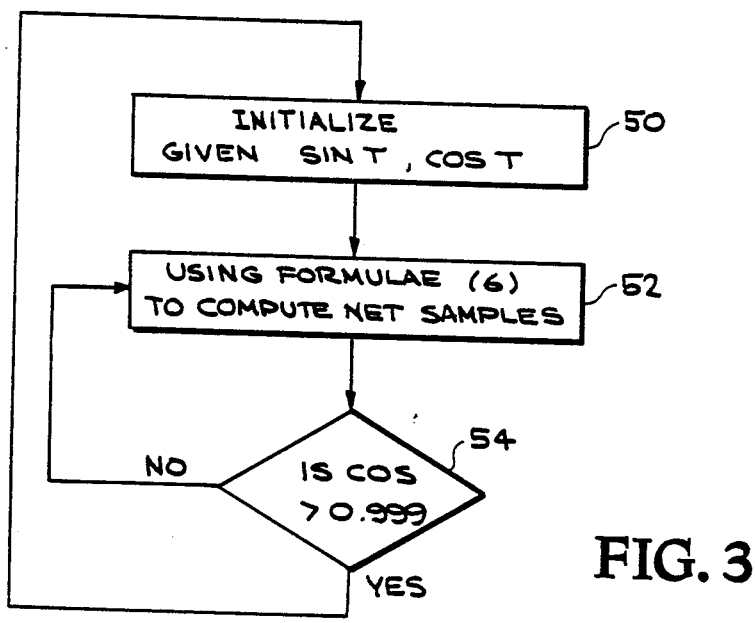
FIG. 3 is a flowchart describing an alternative method of digital generation of tones according to the instant invention.

With reference to FIG. 3, a flowchart is provided employing the Equations (6) to generate samples of periodic waveforms. A block 50 is initially executed which calls for initialization of the cos $2\pi fT$ and sin $2\pi fT$ terms. Such initialization values can be provided by numerical analysis methods know to those of ordinary skill in the art. Next a block 52 is entered which employs Equations (6) to iteratively calculate the next sample values of cosine and sine. In order to avoid accumulation of truncation and roundoff error, a decision block 54 is next entered which tests whether cos $2\pi fT$ exceeds 0.999. This test results in either a return to the initialization block 50 or the recalculation block 52 as was described hereinabove in connection with the Chebyshev method of FIG. 1.

Figure 4:
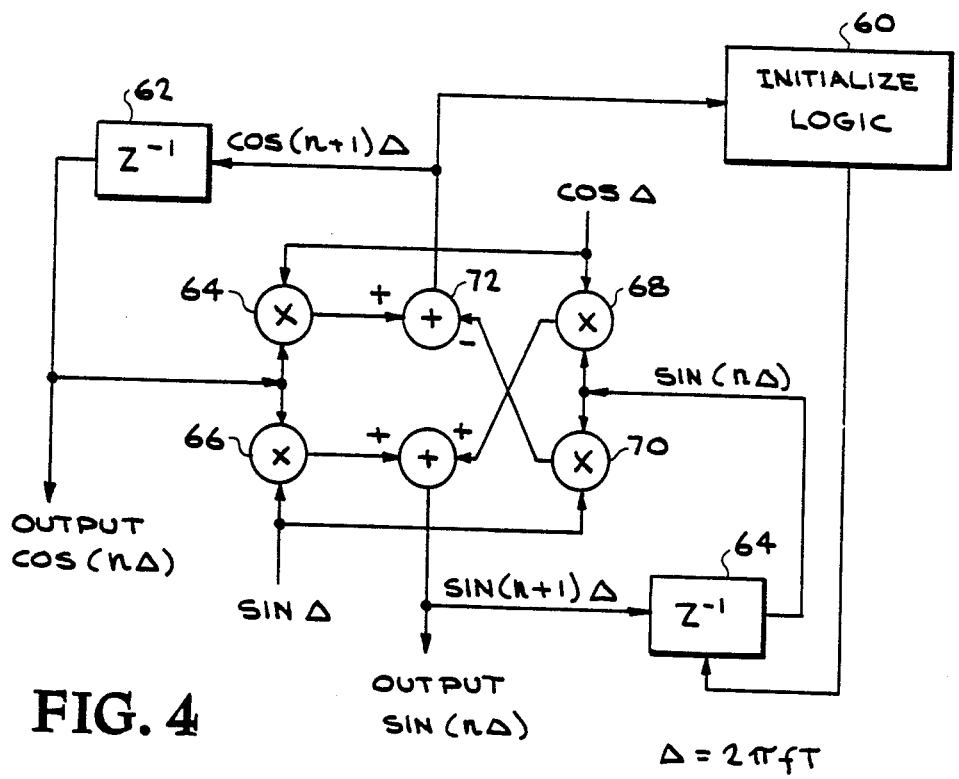
FIG. 4 is a signal-flow diagram for the alternative digital generation of tones according to the instant invention.

With reference to FIG. 4, a signal-flow diagram of an implementation of the method of the instant invention is provided. An initialization block 60 generates the first term of the sequence of tone signals. The signal is received at a first input of a one time-unit delay block 62 and a first input of a one time-unit delay block 64. Delay block 62 generates a signal received at a first input of a multiplier node 65 and a first input of a multiplier node 66. The signal generated by delay 64 is received at a first input of a multiplier node 68 and a first input of a multiplier node 70. A signal corresponding to cos T is received at a second input of multipliers 65 and 68. A signal corresponding to sin T is received at a second input of multipliers 66 and 70.

An adder node 72 receives the signal generated by multiplier 65 at an additive input and the signal generated by multiplier 70 at a subtractive input. An adder node 74 receives the signal generated by multiplier 66 at an additive input and the signal generated by multiplier 68 at a subtractive input. The signal generated by adder 72 is conducted to a second input of delay 62 and to the initialization block 60. The signal generated by adder 74 is conducted to a second input of delay 64 and is the output signal corresponding to the second of Equations (6).

The signal generated by delay 62 is the output signal corresponding to the first of Equations (6). Circuitry internal to block 60 implements the test performed in flowchart decision block 54 (FIG. 3) and resets the signal generated so that the first term of the sequence of tone signals are conducted to delays 62 and 64. Delay blocks 62 and 64 receive control signals (not shown) from initialization block 60 which cause the signals at their first inputs to be selected during the first time period following initialization and signals at their second inputs to be selected at all other time periods.

The method of digitally generating waveforms described in connection with FIGS. 1 and 2 can be employed to provide a method of digital tone detection. If the tone to be detected is given by the sequence of samples $$\{1, \cos 2\pi fT, \cos 2 - 2\pi fT, \cos 3 - 2\pi fT, \ldots\} \qquad (7)$$

and the tone signals received are represented by the sequence of samples $$\{x0, x1, x2, x3, \ldots\} \qquad (8)$$

then, in the case of the method employing the Chebyschev sequence, an error term for each sample is given by the equation $$\text{Error} = X_n - [(2 \cos 2\pi fT)X_{n-1} - X_{n-2}] \qquad (9).$$

Equation (9) represents the difference between the measured tone signals $X_n$ and the signal predicted by the corresponding term of the Chebyschev sequence $C_n$, shown in terms of $X_{n-1}$ and $X_{n-2}$.

If the absolute value of the error is less than a selected threshold value, i.e.

$$|\text{error}| < \text{threshold} \qquad (10)$$

then it is determined that the sequence of received samples (8) has the frequency of the sequence (7).

To control the "Q-factor" employed in conventional tone detectors the threshold value can be lowered, resulting in a "high-Q" filter, or raised, resulting in a "low-Q" filter.

Similarly, to increase the confidence level employed in conventional tone detectors, a voting-logic scheme can be used. For instance, several previous samples can be used in Equation (9) to generate the predicted signal, rather than merely two, $X_{n-1}$ and $X_{n-2}$. Then if a predetermined percentage of these samples, such as 90%, satisfy Equation (10), it is determined that the sequence of received samples (8) has the frequency of sequence (7). In this way, the two major parameters affecting the detection of tones can be chosen independently. This feature of the instant invention provides a significant advantage over the tone detectors of the prior art.

We claim:

1. A method of digitally generating with a digital signal processor a tone signal having a predetermined frequency "f" and amplitude "A" which comprises a sequence of samples "Sm" generated every "T" seconds, said tone signal having a waveform represented by the equation, $$S = A \cos\{m(2\pi fT)\},$$

said method comprising the following combination of sequential steps, (a) initializing said signal processor to cause said first two samples $S_0$ and $S_1$ that are generated to correspond respectively to the equations, $$S_0 = 1 \text{ and } S_1 = \cos 2\pi fT,$$

(b) generating the next sequential said samples with said signal processor according to the equation, $$S_{(m+1)} = 2S_{(m)}S_1 - S_{(m-1)},$$

(c) storing a predetermined threshold value in said signal processor,
(d) comparing with said signal processor the value of each said sample generated generated in step (b) to said stored threshold value,
(e) repeating step (b) to generate the next sample when the result of said comparison step indicates that the value of the last generated sample does not exceed said predetermined threshold value, and
(f) repeating step (a) to generate the next said sample when the result of said comparison step indicates that the value of said last generated sample does exceed said predetermined threshold whereby the further propagation of any rounding and truncating errors that might have been produced by said digital signal processor in generating previous said samples in step (b) is prevented.

2. The method recited in claim 1 in which said amplitude "A" is predetermined, further including the step of, (a) multiplying with said signal processor each said equation term $S_{(m)}$ generated in steps (a) and (b) of claim 1 by said amplitude "A".

3. A method of digitally generating cosine and sine waveforms with a digital signal processor for use in transmitting digital data over analog telecommunication lines by a Quadrature Amplitude Modulation technique, said waveforms each having a predetermined frequency "f" and amplitude "A" and comprising a sequence of samples generated every "T" seconds, said cosine waveform represented by the equation, $$\cos(m+1)2\pi fT = \cos m\, 2\pi fT \cdot \cos 2\pi fT - \sin m2\pi fT \cdot \sin 2\pi fT,$$

and said sin waveform represented by the equation, $$\sin(m+1)T = \sin mT \cos T + \cos m2\pi fT \cdot \sin 2\pi fT$$

said method comprising the following combination of sequential step (a) producing a first and second sequence of signals S1(m) and S2(m) with said digital signal processor, including the steps of providing in said signal processor initialized values corresponding to the values of said $\cos(2\pi fT)$ and $\sin(2\pi fT)$ terms,
(b) generating the first two signals of said first sequence $S1(0)=1$, $S1(1)=\cos(2\pi fT)$, and the first two signal of said second sequences $S2(0)=0$, $S2(1)=\sin(s\pi fT)$,
(c) generating succeeding signals S1(m) and S2(m) in accordance with the following equations;

$$S1(m+1) = S1(m) \cdot S1(1) - S2(m) \cdot S2(1)$$

$$S2(m+1) = S2(m) \cdot S1(1) + S1(m) \cdot S2(1)$$

(d) storing a predetermined threshold value in said digital processor,
(e) comparing the value of S1(m+1) to said stored threshold value
(f) repeating step (c) to generate the next succeeding signal when the result of said comparison step indicates that the value of the last generated signal does not exceed said predetermined threshold value, and
(f) repeating step (b) to generate the next said signal when the result of said comparison step indicates that the value of said last generated signal does exceed said predetermined threshold whereby the further propagation of any rounding and truncating errors that might have been produced by said digital signal processor in generating previous said signals samples in step (c) is prevented.

4. The method recited in claim 3 including the further step of (a) developing a third sequence of signals S3(m) from said first and second sequences by arithmetically combining with said digital signal processor corresponding signals of said first and second sequences.

* * * * *